(12) United States Patent
Riggs

(10) Patent No.: US 8,681,832 B2
(45) Date of Patent: Mar. 25, 2014

(54) SYSTEM AND METHOD FOR HIGH ACCURACY GAS INJECT IN A TWO CHAMBER GAS DISCHARGE LASER SYSTEM

(75) Inventor: Daniel J. Riggs, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 244 days.

(21) Appl. No.: 13/251,181

(22) Filed: Sep. 30, 2011

(65) Prior Publication Data

US 2013/0083818 A1    Apr. 4, 2013

(51) Int. Cl.
*H01S 3/22*    (2006.01)

(52) U.S. Cl.
USPC ............................................. 372/59

(58) Field of Classification Search
CPC ........ H01S 3/036; H01S 3/0014; H01S 3/225
USPC .................. 372/57, 58, 59; 359/335, 438; 318/400.02; 141/8
See application file for complete search history.

(56) References Cited

U.S. PATENT DOCUMENTS

| | | | |
|---|---|---|---|
| 5,978,406 A | 11/1999 | Rokni et al. | |
| 6,690,704 B2 | 2/2004 | Fallon et al. | |
| 6,865,210 B2 | 3/2005 | Ershov et al. | |
| 7,209,507 B2* | 4/2007 | Rule et al. | 372/58 |
| 7,277,464 B2 | 10/2007 | Rule et al. | |
| 7,741,639 B2* | 6/2010 | Besaucele et al. | 257/55 |
| 7,830,934 B2 | 11/2010 | Jacques et al. | |
| 7,835,414 B2* | 11/2010 | Dunstan et al. | 372/59 |
| 7,899,095 B2* | 3/2011 | Partlo | 372/29.011 |
| RE42,588 E * | 8/2011 | Fallon et al. | 372/58 |

\* cited by examiner

*Primary Examiner* — Jessica Stultz
*Assistant Examiner* — Tuan Nguyen
(74) *Attorney, Agent, or Firm* — Gard & Kaslow LLP

(57) ABSTRACT

Systems and methods for automatically performing a high accuracy gas inject in a laser chamber of a two chamber gas discharge laser such as an excimer laser are disclosed. A mathematical model relates the amount of halogen gas in the laser chamber after an inject to the amount of halogen gas present prior to the inject, the amount of halogen gas injected, and the consumption rate of halogen gas in the chamber. A fixed amount of halogen gas is added to the chamber in an initial number of injects to allow transients to settle out, after which the amount of halogen gas to be injected is that calculated to result in a desired amount of halogen gas after the inject according to the model. Measurements are taken after injects to update the actual amount of halogen gas present and the consumption rate of the halogen gas.

23 Claims, 6 Drawing Sheets

SYSTEM AND METHOD FOR HIGH ACCURACY GAS INJECT IN A TWO CHAMBER GAS DISCHARGE LASER SYSTEM

FIELD OF THE INVENTION

The present invention relates generally to laser systems. More specifically, the invention relates to performing injects of reactive gas into the chambers of a gas discharge laser, such as a two chamber Master Oscillator-Power Amplifier excimer laser.

BACKGROUND OF THE INVENTION

One type of gas discharge laser used in photolithography is known as an excimer laser. An excimer laser typically uses a combination of a noble gas, such as argon, krypton, or xenon, and a reactive halogen, gas such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and, the laser continues to function properly.

One way to do this is with a full replenishment of the gas in the chambers, called a refill, where all of the gas is replaced while the laser is not firing to return the gas content in the chamber to the desired mix, concentration and pressure. However, refills are extremely disruptive as the laser must be shut off during the refill process, and thus the lithographic exposure of semiconductor wafers must also be paused in a controlled manner at the same time and then restarted when the laser is again operational to avoid improper processing of the wafers. For this reason, it is typical to refill both chambers at once to save time, although this is not necessary.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One way of doing this is by performing a partial replenishment of the gas in the chambers, known as an inject, rather than a full refill. As long as the laser is able to continue to operate within certain parameters, it is not necessary to shut the laser down for the inject, and thus processing may continue during the inject process.

A number of prior methods and systems have been described for managing injects, including, for example, how to determine when an inject should occur and the amount of halogen gas to be provided by the inject. See, for example, U.S. Pat. Nos. 7,741,639 and 7,835,414, owned by the assignee of the present application. However, until now it has been difficult to accurately estimate the halogen gas consumption in both the master oscillator and power amplifier chambers and thus calculate the amount of gas that should be injected into each.

A more accurate inject would allow the laser to operate for a longer period of time before another refill and/or inject must be performed. Further, an accurate inject provides a better basis on which to base the calculation of subsequent injects to the laser chambers. It is thus desirable that injects be performed in a fashion that results in a highly accurate concentration of gasses.

SUMMARY OF THE INVENTION

Systems and methods for automatically performing a high accuracy gas inject in a laser chamber of a two chamber gas discharge laser such as an excimer laser are disclosed. A mathematical model relates the amount of halogen gas in the laser chamber after an inject to the amount of halogen gas present prior to the inject, the amount of halogen gas injected, and the consumption rate of halogen gas in the chamber. A fixed amount of halogen gas is added to the chamber in an initial number of injects to allow transients to settle out, after which the amount of halogen gas to be injected is that calculated to result in a desired amount of halogen gas after the inject according to the model. Measurements are taken after injects to update the actual amount of halogen gas present and the consumption rate of the halogen gas.

In one embodiment, a dual chamber gas discharge laser light source is described, comprising a master oscillator and an amplifier, each of the master oscillator and amplifier having a laser chamber containing a lasing medium gas comprising a halogen, and a gas replenishment system including a controller executing a replenishment scheme at regular intervals, the replenishment scheme comprising: modeling the amount of halogen gas in the chamber after an inject opportunity based upon the amount of halogen gas in the chamber before the inject opportunity and the amount of halogen gas added to the chamber during the inject opportunity; after a first number of inject opportunities, measuring a parameter of the laser light source to estimate the amount of halogen gas in the chamber after the inject opportunity and updating the mathematical model based upon the measurement of the parameter; for a second number of inject opportunities larger than the first number, injecting into the selected laser chamber at each inject opportunity a fixed quantity of a non-halogen containing gas and a fixed quantity of the halogen containing gas; and after the second number of inject opportunities, injecting into the selected laser chamber at each inject opportunity a fixed quantity of a non-halogen containing gas and a quantity of the halogen containing gas predicted to result in a desired amount of halogen gas in the chamber after the inject opportunity.

In another embodiment, a method of replenishing gas in a dual chamber gas discharge laser light source having a master oscillator and an amplifier is described, each of the master oscillator and amplifier having a laser chamber containing a lasing medium gas comprising a halogen, the method comprising the steps of: selecting a plurality of inject opportunities occurring at regular intervals; modeling the amount of halogen gas in the chamber after an inject opportunity based upon the amount of halogen gas in the chamber before the inject opportunity and the amount of halogen gas added to the chamber during the inject opportunity; after a first number of inject opportunities, measuring a parameter of the laser light source to estimate the amount of halogen gas in the chamber after the inject opportunity and updating the mathematical model based upon the measurement of the parameter; for a second number of inject opportunities larger than the first number, injecting into the selected laser chamber at each inject opportunity a fixed quantity of a non-halogen containing gas and a fixed quantity of the halogen containing gas; and after the second number of inject opportunities, injecting into the selected laser, chamber at each inject opportunity a fixed quantity of a non-halogen containing gas and a quantity of the halogen containing gas predicted to result in a desired amount of halogen gas in the chamber after the inject opportunity.

Still another embodiment discloses a non-transitory computer-readable medium having embodied thereon a program, the program being executable by a processor to perform a method of automatically replenishing the gas in a laser chamber of a dual chamber gas discharge laser light source having a master oscillator and an amplifier, each of the master oscillator and amplifier having a laser chamber containing a lasing medium gas comprising a halogen, the method comprising the steps of: selecting a plurality of inject opportunities occurring at regular intervals; modeling the amount of halogen gas in the chamber after an inject opportunity based upon the amount of halogen gas in the chamber before the inject opportunity and the amount of halogen gas added to the chamber during the inject opportunity; after a first number of inject opportunities, measuring a parameter of the laser light source to estimate the amount of halogen gas in the chamber after the inject opportunity and updating the mathematical model based upon the measurement of the parameter; for a second number of inject opportunities larger than the first number, injecting into the selected laser chamber at each inject opportunity a fixed quantity of a non-halogen containing gas and a fixed quantity of the halogen containing gas; and after the second number of inject opportunities, injecting into the selected laser chamber at each inject opportunity a fixed quantity of a non-halogen containing gas and a quantity of the halogen containing gas predicted to result in a desired amount of halogen gas in the chamber after the inject opportunity.

DETAILED DESCRIPTION OF THE INVENTION

The present application describes a method and system for automatically performing injects of halogen gas into one or both chambers of a two chamber gas discharge laser such as a MOPA excimer laser for the purpose of regulating the halogen gas concentration with greater accuracy than previously done.

It is expected that an inject process as described herein will result in increased accuracy of halogen gas and mitigate or eliminate many of the issues associated with previous inject methods. Control of the inject process is based upon a model that uses one or more of several available signals and parameters of the laser operation to calculate the amount of halogen gas to be added to the desired chamber(s) by taking into account the amount of halogen gas present at prior times, the rate of consumption of halogen gas in the chamber, the pressure in the chamber before the inject, and the desired pressure after the inject. Several of these parameters are measured at regular intervals and the model is updated based upon such measurements. By allowing for and updating these factors in the process, significantly more accurate control of fluorine concentration is achieved than with the processes of the prior art.

Figure 1:
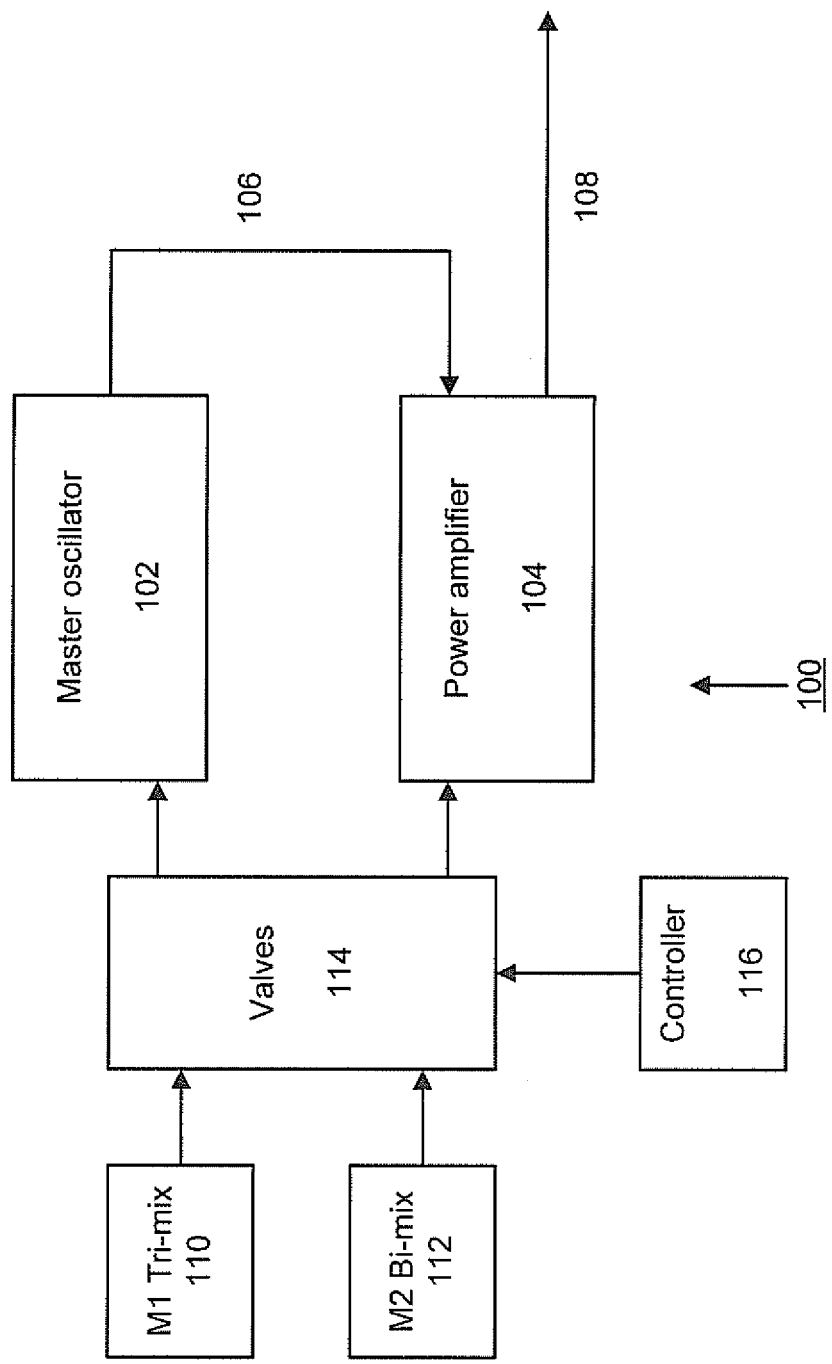
FIG. 1 shows a simplified block diagram of a gas replenishment system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner machine (not shown) for use in lithography.

Each laser chamber contains a mixture of gases; for example, in a given excimer laser each laser chamber might contain a halogen, e.g., fluorine, along with other gases such argon, neon, (commonly known as rare gases) and possibly others in different partial pressures that add up to a total pressure P. For simplicity, the halogen gas is hereafter described as fluorine, although the principles described herein may be applied to other halogen gases as well.

Gas bottles 110 and 112 are connected to the master oscillator 102 and power amplifier 104 through valves 114 to allow for replenishment of the gas in the laser chambers when desired. Gas bottle 110 typically might contain a mixture of gases including fluorine, argon and neon, known as an "M1 mix," "tri-mix," or often simply "fluorine," while gas bottle 112 might contain a mixture of argon, neon and/or other gases, but no fluorine, known as an "M2 mix," "bi-mix," or "rare gas." A controller 116, such as a processor or logic circuit, operates the valves 114 to transfer gases from bottles 110 and 112 into the laser chambers of the master oscillator 102 and power amplifier 104 based upon certain data as described further herein.

As is known in the art, two bottles of gas are needed, since the fluorine in gas bottle 110 is at a particular concentration that is typically higher than that desired for laser operation. In order to add the fluorine to the laser chamber of the master oscillator 102 or power amplifier 104 at a desired lower concentration, the gas in bottle 110 must be diluted, and the non-halogen containing gas in bottle 112 is used for this purpose.

Although not shown, valves 114 typically include two valves for each laser chamber, an "injection" valve that allows gas to pass into and out of each chamber at a first rate, and a "chamber fill" valve that allows gas to pass into and out of each chamber at a second, and faster, rate. In addition, the laser chambers in the master oscillator 102 and power amplifier 104 contain blowers for mixing the gases that are in the chambers so that a homogenous mixture is maintained during operation. The blowers also add heat to the gas.

As mentioned above, fluorine is consumed during operation of the laser. The resulting decrease in fluorine concentration typically causes a rise in the discharge voltage required to produce a laser pulse. In addition, changes in fluorine concentration also affect the delay time ("dtMOPA") between the electrical discharges that cause production of the first laser beam 106 and the amplified laser beam 108.

Thus, the fluorine concentration must be replenished to keep the laser operating within desired parameters. Further, a satisfactory concentration of fluorine must be maintained while keeping the gas content in each laser chamber at a fixed pressure. Again, this is sometimes done by injects, i.e., partial replenishment of the gas in the chamber, rather than a full refill in which the chamber is purged and the gas completely replaced.

As with full refills, injects are typically done at fixed intervals, determined either by elapsed time between injects, or by the number of "shots," i.e., pulses of the laser, that have been generated. In some prior art systems, injects are done in each chamber after approximately every 1 million pulses by that chamber. For easier operation, the injects to the laser chambers are staggered, so that while each chamber receives an inject after about each million pulses, the power amplifier 104 receives an inject approximately 500,000 pulses after the master oscillator 102 receives an inject, and vice versa. Such timing of injects is described, for example, in U.S. Pat. No. 7,835,414, owned by the assignee of the present application.

However, while a full refill simply replaces all of the gas in the laser chamber, an inject is intended mainly to replace the amount of fluorine that has been consumed since the last refill or inject. Since it is mostly the fluorine that is consumed during operation, it is known in the prior art that injects to the laser chambers in both the master oscillator and power amplifier will include a fixed amount of the M2 mix, which contains no fluorine, and an amount of M1 mix containing enough fluorine to raise the concentration of fluorine in the chamber back to a desired level, thus replacing the fluorine which has been consumed.

Figure 2:
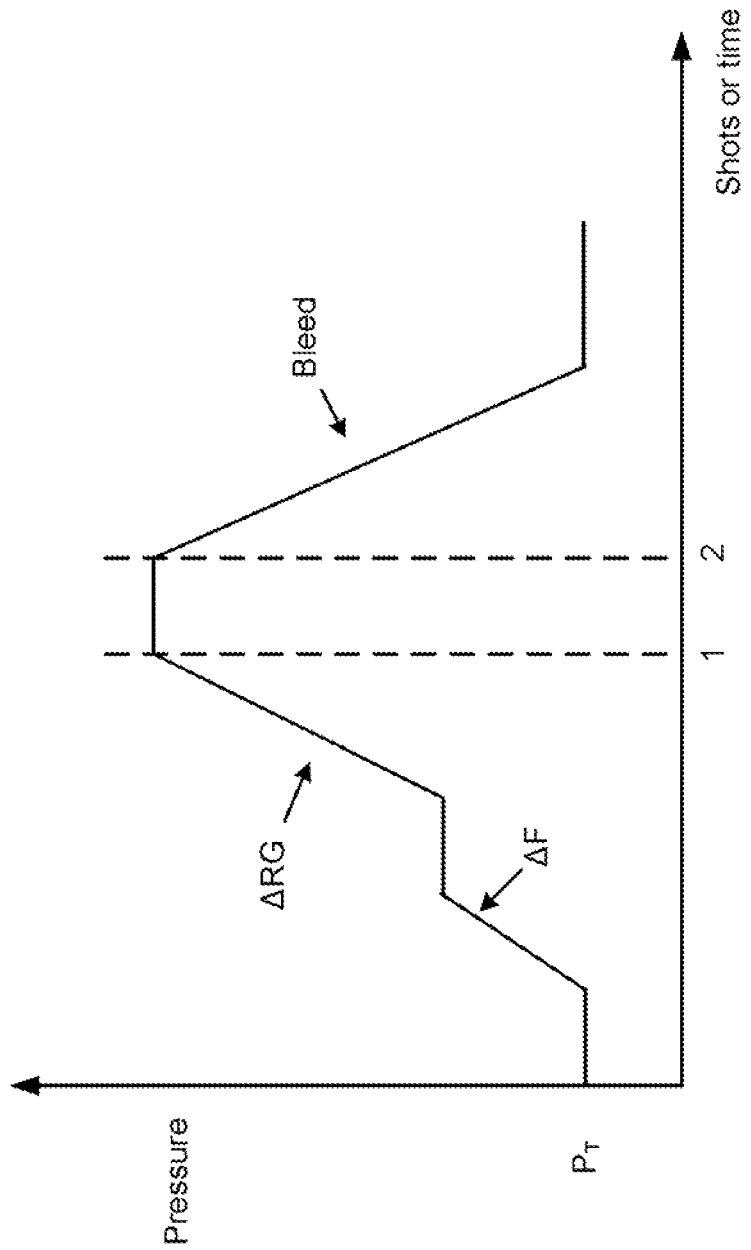
FIG. 2 shows a single inject for replenishing the gas in a chamber of a dual chamber gas laser, such as a MOPA excimer laser, as may be done in both the prior art and one embodiment herein.

FIG. 2 illustrates a typical single inject as may be done in both the prior art and the methods and systems described herein. An inject may be performed in the laser chamber of the master oscillator or the power amplifier, or in both chambers. As above, if injects are done to both chambers, one is typically done after the other rather than simultaneously.

In a given inject, the chamber in which fluorine is being replenished is initially at a target pressure $P_T$. An amount of fluorine is added to the chamber; as above, this is actually done by adding an amount of M1 mix, designated as $\Delta F$, to the chamber, of which the fluorine is a part. The addition of $\Delta F$ increases the chamber pressure as shown. Following this, an amount of M2 mix is added to the chamber, as shown by $\Delta RG$, increasing the pressure in the chamber further. Typically the amount of $\Delta RG$ remains the same for all injects, and only the amount of the M1 inject $\Delta F$ is varied.

Again, as above, for simplicity in formulas the M1 mix will be referred to simply as fluorine, or F, and the M2 mix as RG (for "rare gas"). The desired amount of M1 mix that is to be added, $\Delta F$, is that which will result in a desired concentration of fluorine in the chamber, given the fluorine remaining in the chamber before the inject and the subsequent dilution by the additional M2 mix $\Delta RG$. Once the M1 and M2 mixes have been added and the desired concentration of fluorine attained, after a delay to allow the gases to fully mix in the chamber (the period from point 1 to point 2 on FIG. 2), the now mixed gas is bled from the chamber to reduce the pressure, typically back to the target pressure $P_T$, without altering the fluorine concentration. (Note that in some embodiments, the value of $P_T$ after the inject need not be identical to the pressure before the inject, although here it is assumed that it is the same.)

It has traditionally been difficult to accurately calculate the amount of fluorine that has been consumed in the chamber, which in turn makes is difficult to determine the amount of M1 mix $\Delta F$ that should be added to compensate. Some previous efforts to manage injects have used fixed amounts of the M2 gas mix (as from gas bottle 112 in FIG. 1), while calculating the amount of the M1 gas mix based upon various parameters measured at regular intervals, such as approximately every 30 seconds. For example, in some cases, the injects to the master oscillator have been calculated solely or primarily from dtMOPA, while the injects to the power amplifier have been calculated from the energy output of the master oscillator and the discharge voltage, or some other parameter used as a substitute for the consumed fluorine. However, the changes in such parameters are generally poor approximations for the actual fluorine consumption, and thus do not result in accurate determination of an appropriate size of the $\Delta F$ inject.

The present application seeks to provide an improved model for determining the amount of fluorine to be added to a chamber during an inject. As will be seen, the model incorporates data regarding the dynamic change of gas concentrations as the laser operates, and the correlation of the measured data with gas concentrations, to yield improved estimates of fluorine consumption rate and fluorine partial pressure. The method described herein also provides for updating the model before each inject if appropriate data about the actual amount of fluorine present and/or an updated rate of consumption can be obtained.

Figure 3:
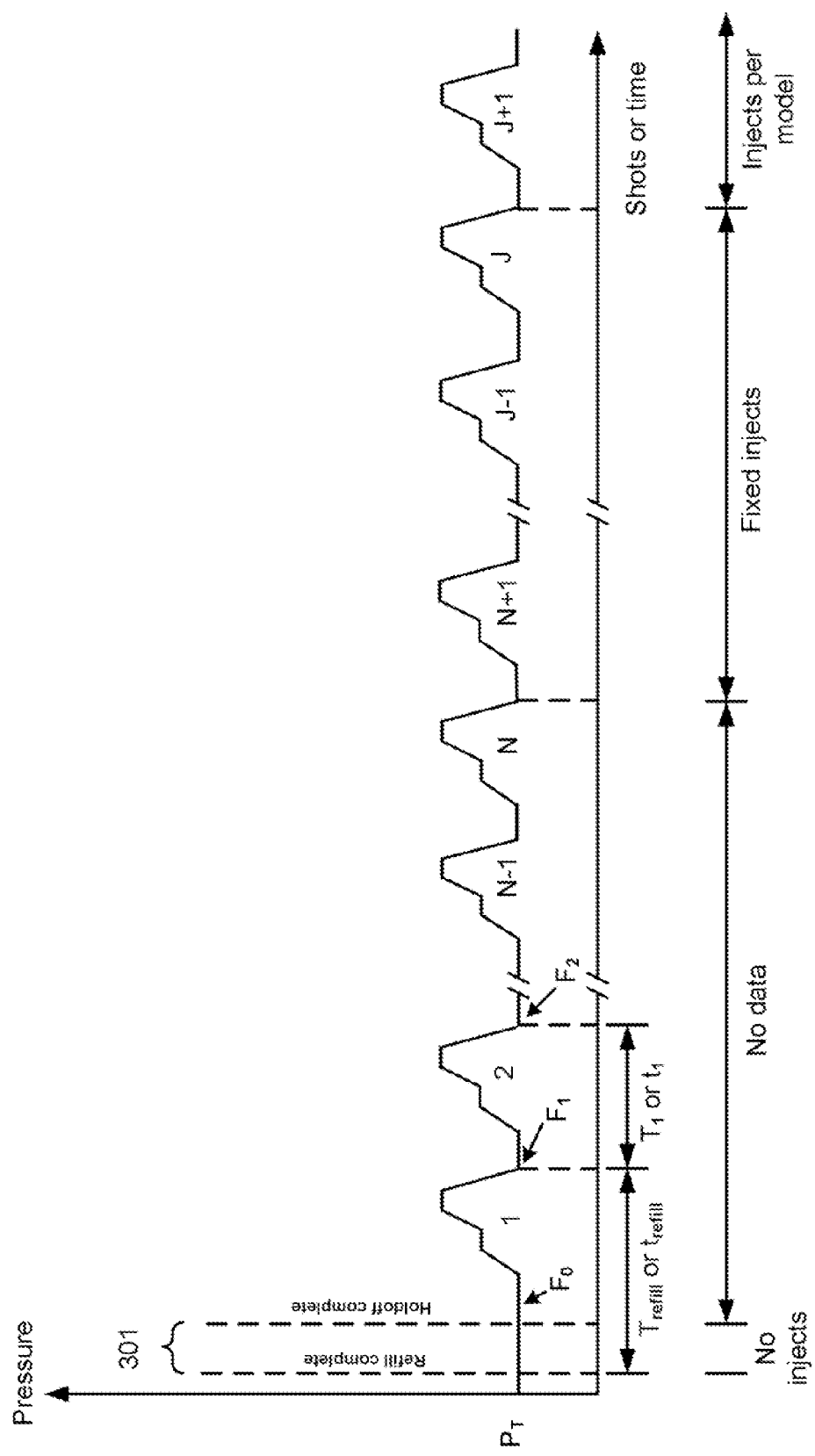
FIG. 3 shows a series of injects for replenishing the gas in a chamber of a dual chamber gas laser, such as a MOPA excimer laser, for illustrating a model for determining the expected amount of fluorine in the chamber in one embodiment.

FIG. 3 illustrates a series of injects for use in understanding the method described herein for calculating the desired amount of fluorine to be injected according to one embodiment. Note that the horizontal axis refers to both shots and time, although as above the intervals between injects are typically evenly separated by the number of shots fired, and not necessarily by elapsed clock time.

As in the prior art, once a refill has been completed the laser begins or resumes operation, firing shots, i.e., laser pulses that may be used to process semiconductor wafers. Injects will normally begin after a specified period of operation as shown in FIG. 3, stating with inject 1, and the injects numbered sequentially continuing with 2, and (after a period not shown) N−1, N, etc. Again as in the prior art, the injects typically occur periodically, for example, after every million shots fired by the laser in operation. Normal processing of wafers may occur as the shots are fired during and between injects.

As above, the model is to be updated, but it is desirable to update only with useful, or "good," data. For example, when the laser begins or resumes operating after a refill or a long pause during which pulses are not generated, there will be a period in which transient effects occur, and any data obtained during such a period may not reflect a desired operating condition of the laser. To avoid creating errors in subsequent injects, it is thus desirable to allow the laser to operate for some period of time so that such transient effects will die out and the laser operates in a steady state before attempting to employ any type of data collection or model updating.

An allowance for transients may be made in several ways. First, there may be a "holdoff" period 301 of some number of shots during which the laser is operated and no injects are done until inject 1 occurs, as shown in FIG. 3. (In some cases this period may be adjusted by the user, and can be set to 0 if desired, so that injects are done from the beginning of laser operation.)

Even after a holdoff period when no injects are performed, however, when injects are begun, some of the first injects may still be subject to transient effects, so that any measurements of parameters used in prior art methods, or in the model described herein, may still not result in useful data. To avoid this possibility, in one embodiment of the method described herein, once the holdoff ends and injects begin, the data from some initial number N of injects is not collected. (Alternatively, the data may be collected but is not used to update the model.)

As will be discussed, there are some uncertainties about the physical process which are reflected in the model, and thus continued use of the model may result in increased likelihood that the gas concentration in the chamber may differ significantly from that estimated by the model unless data is used to update the current state of the model. For this reason, once a steady state of operation is obtained, it is desirable to collect data and update the model for some period of time, so that any deviations between the results of the model and the actual operation of the laser will be reduced, before using the model to adjust the amount of fluorine added during an inject. Thus, while data is collected after N injects, for some larger number J injects (i.e., J is greater than N), the size of the injects is fixed, i.e., a fixed amount of the M1 mix, ΔF, is added, in each of these injects. An appropriate size ΔF for this period may be based on the historical operational data of the laser, as will be understood by one of skill in the art.

After N injects have occurred, data from subsequent injects is collected and used to update the model. The model is then updated after each inject until J injects have occurred. The first use of the model to determine the amount of fluorine to be injected based on the collected data will thus be for inject J+1 and will be based on the previous J−N injects.

It will thus be seen that in such an embodiment there are four phases of operation after a refill. In a first phase, the holdoff period, there will be no injects. In the second phase, there will be N fixed injects and no data will be used to update the model. In the third phase, there will be J−N fixed injects and data will be used to update the model. In the fourth phase, after J injects, the inject sizes will be variable and based upon the model as it is updated from the collected data.

Returning to FIG. 3, consider the first injects after a refill. When a refill is complete, there will be some amount of fluorine mix $F_0$ and some amount of rare gas RG (measured in kPa) in the chamber before an inject takes place. As above, the fluorine comes from the M1 mix, and the rare gas comes from both the M1 and M2 mix. The concentration of fluorine [F] is thus given by:

$$[F] = \frac{F_0}{F_0 + RG}$$

and $$F_0 = [F] \times P_T$$

where $F_0$ is the total amount of fluorine and $P_T$ is the pressure in the chamber.

After the first inject, the amount of fluorine $F_1$ (at the point labeled $F_1$ on FIG. 3) will be based upon the value of $F_0$, the added fluorine ΔF and non-fluorine gas ΔRG, and the consumption of fluorine during the elapsed time.

The model described herein seeks to improve the accuracy of injects by, inter alia, improving the estimates of the rate of consumption of fluorine. There are two types of consumption of fluorine, consumption due to shots fired by the laser and consumption due to the passage of time. The rate of consumption of fluorine due to shots of the laser is defined as $\omega_f$ ("f" for firing) and the rate of consumption due to the passage of time is defined as $\omega_{nf}$ ("nf" for non-firing).

To determine the amount of fluorine after the first inject, at the point labeled $F_1$, each rate of consumption is multiplied by the amount of shots or time respectively that has passed since the refill. A measure of elapsed shots $T_{REFILL}$ is defined as the number of shots fired since the refill and used with $\omega_f$ to determine the consumption of fluorine due to the firing of the laser. Similarly, a measure of elapsed time $t_{REFILL}$ is defined as the clock time since the refill and used with $\omega_{nf}$ to determine the consumption of fluorine due to time. As above, both shots and time are shown on the horizontal axis of FIG. 3, and so $T_{REFILL}$ and $t_{REFILL}$ are shown at the same point on FIG. 3, i.e., the end of inject 1. However, they are different events causing the consumption of fluorine, one the passage of time measured in minutes and seconds, and the other the number of shots fired by the laser.

With these definitions, $F_1$ is given by the equation:

$$F_1 = \left[ \frac{F_0 - \omega_f T_{REFILL} - \omega_{nf} t_{REFILL} + \Delta F}{\Delta F + \Delta RG + P_T} \right] P_T \quad (1)$$

This is the basic model. However, some variations are possible. For example, here it is assumed that the target pressure $P_T$ is the same before and after the inject. In other embodiments, the two points may have different pressures, in which case the value of $P_T$ in the denominator is the pressure in the chamber before the inject, and the value of $P_T$ outside the brackets is the chamber pressure after the inject. Also, for simplicity, the model does not take into account gas that remains in the pipes; one example of how this might be done in a refill sequence is shown in U.S. patent application Ser. No. 13/174,484, owned by the assignee of the present application.

As is known in the art, there is some uncertainty in several of the stated parameters. For example, the rates of consumption $\omega_f$ and $\omega_{nf}$ are known only within certain limits. In the case of $\omega_f$ (units of kPa/shot), there are known upper and lower bounds, but the actual value is somewhat uncertain within those bounds and also varies through the gas life. The value of $\omega_{nf}$ is similarly known only to some degree of certainty, although it tends to be approximately constant over the gas life. Even the value of $F_0$, the amount of fluorine at the end of a refill, has some uncertainty, due to such things as variations in the precision of the amount of fluorine in the M1 mix, the pressure in the tank, etc., although this uncertainty is believed to be small.

Thus, the calculated value of $F_1$ is really an estimate of the actual value, based on the estimated value of $F_0$ and the estimates of the consumption rates $\omega_f$ and $\omega_{nf}$. The initial estimates of consumption rates are derived from historical data and engineering tests using external fluorine sensors.

It will be seen that the amount of fluorine after a second inject $F_2$ is similarly given by the model as:

$$F_2 = \left[\frac{F_1 - \omega_f T_1 - \omega_{nf} t_1 + \Delta F}{\Delta F + \Delta RG + P_T}\right] P_T \quad (2)$$

Now, however, the model starts with the calculated value of $F_1$ as described above, and $T_1$ and $t_1$ represent the number of shots fired and elapsed time respectively from the end of the first inject to the end of the second inject, rather than from the refill. Here it is again assumed that the chamber pressure $P_T$ is the same before and after the second inject; as above, in other embodiments these values may be different. The values of $\Delta F$ and $\Delta RG$ remain the same during the period of M fixed injects.

It will be appreciated that, in the absence of any check or correction, repeatedly running the model to calculate the amount of fluorine $F_K$ after each inject may simply result in such estimates containing increasing errors over time, given that each successive value of $F_K$ is based on the prior estimate $F_{K-1}$. It is for this reason that it is also desirable to update the model with collected data for some period of time before switching from fixed injects of fluorine to amounts predicted by the model.

Figure 4:
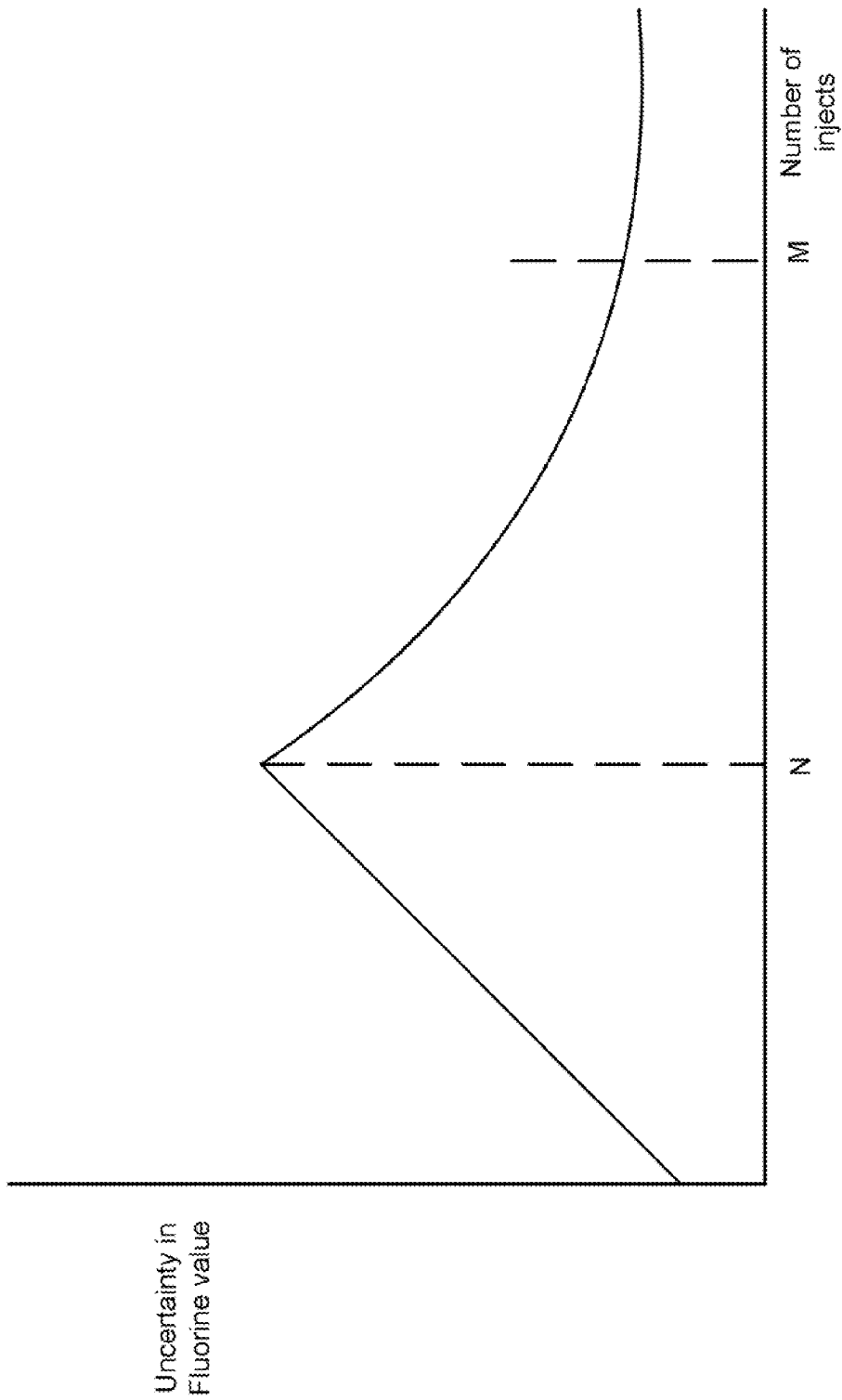
FIG. 4 is an illustration of the expected growth in uncertainty in the value of fluorine predicted by the model over the first N injects in the absence of any updated data, and the subsequent reduction in that uncertainty as collected data is used to update the model over the subsequent M-N injects.

This may be seen in FIG. 4, which shows generally how it is expected that the uncertainty in the value of fluorine predicted by the model may grow initially over the first N injects in the absence of any updated data, and then be educed as collected data is used to update the model over the subsequent J–N injects.

It will be apparent that there is a tradeoff between the desire to allow more time for any transients to settle and the increasing errors that accumulate over a longer period. It is believed that a value for N in double digits, i.e., the first few tens of injects, is a sufficiently long period for most transients to settle and the data to become valid, although in some circumstances even a value for N as low as 10 may suffice.

The value for J should be great enough to allow the model to reconverge on the normal operating condition of the laser; in some circumstances it is believed that a value for J as low as 30 injects may suffice. One of skill in the art will recognize that these numbers may vary from laser to laser for a variety of reasons and that if, for example, the method is run with N=10 and J=30 and unsatisfactory results are obtained, the values may be increased to allow more injects to pass until acceptable results are obtained.

After J injects, it is assumed that the laser has converged on its proper operation, and the value of $F_J$ is thus assumed to be the desired amount of fluorine $F_T$; this value is stored as the target value for the algorithm. Thereafter, when the model is run, the amount of fluorine $\Delta F$ to be added in a given inject k is that calculated to cause the amount of fluorine $F_k$ after the inject to be equal to $F_T$.

As stated above, it is desirable to collect data regarding the actual values of some of the terms in the model during operation of the laser to improve the model by refining or replacing the estimated values. In one embodiment, a parameter V is selected and measured. In one embodiment, when considering injects to the power amplifier chamber, V may be the discharge voltage, while in the case of the master oscillator chamber V may be the delay time ("dtMOPA") between an electrical discharge in the master oscillator chamber that creates a laser shot and the subsequent electrical discharge in the power amplifier chamber that amplifies the shot.

In some embodiments, V may be some other measurement such as bandwidth, which may be measured by the integral of a certain percentage of the energy contained on either side of a center wavelength of a spectrum centered on the center wavelength. One bandwidth measure used in other contexts is the integral of 95% of the energy is common and is known as E95% or simply E95. Another parameter used elsewhere is the common voltage applied to both chambers, for example, at the peaking capacitor of a compression head of a solid state pulsed power system (SSPPM) for each chamber, and the energy output of one of the chambers. For the master oscillator chamber this is designated as $E_{MO}$. Other suitable parameters and/or combinations of parameters for estimating the amount of, or rate of consumption of, fluorine will be apparent to those of skill in the art.

The value of V in general will be related to the amount of fluorine $F_K$ after an inject K by the equation:

$$V_k = h(F_k) + \frac{dV}{dt_k}(T_{SINCE\ REFILL}) + \vartheta_k \quad (3)$$

where $T_{SINCE\ REFILL}$ is the total number of shots since the refill, regardless of the number of injects that have occurred, $\sigma_k$ is the component of the measurement that is not correlated with the fluorine amount, and h is an appropriate constant. One of skill in the art will recognize how to appropriately determine h depending upon which parameter is being measured as V.

The measurement of V will typically be done at the end of an inject. Once the inject is over, the model is run again for the inject that has just occurred; now, however, the actual size of the inject, i.e., $\Delta F$ and $\Delta RG$, is known, as are the actual number of shots fired T and elapsed time t. Based on historical data, the measured parameter V may thus be correlated to the actual amount of fluorine F present, and the firing consumption rates $\omega_f$, so that the values of these in the model may be updated to more accurately reflect the current conditions in the chamber.

For easier implementation in a computer-controlled system, the model, including updating the value of $F_K$, can be written as a state equation using matrices as:

$$\begin{bmatrix} F_k \\ \omega_{f,k} \\ \frac{dv}{dt_k} \end{bmatrix} = \begin{bmatrix} P_T & -P_T T_k & 0 \\ \overline{P_T + \Delta F_k + \Delta RG} & \overline{P_T + \Delta F_k + \Delta RG} & \\ 0 & 1 & 0 \\ 0 & 0 & 1 \end{bmatrix} \quad (4)$$

$$\begin{bmatrix} F_{k-1} \\ \omega_{f,k-1} \\ \frac{dv}{dt_{k-1}} \end{bmatrix} + \begin{bmatrix} \frac{P_T}{P_T + \Delta F_k + \Delta RG} \\ 0 \\ 0 \end{bmatrix} \Delta F_k +$$

$$\begin{bmatrix} \frac{-\omega_{nf} P_T t_k}{P_T + \Delta F_k + \Delta RG} \\ 0 \\ 0 \end{bmatrix} + \begin{bmatrix} n_{F,k} \\ n_{\omega_f,k} \\ n_{\frac{dv}{dt},k} \end{bmatrix}$$

where $F_k$=fluorine after inject K
$\Delta F_k$=amount of fluorine injected
$\Delta RG$=amount of rare gas injected This model assumes that $\omega_f$ is initially constant as a prediction, i.e., that $\omega_{f,k}$ is the same as $\omega_{f,k-1}$, since it is initially unknown how it will change, and that dv/dt is also constant. The final term is again a noise and/or disturbance vector that is treated as additive noise.

For simplification, a value $\alpha_k$ is defined as:

$$\alpha_k = \frac{P_T}{P_T + \Delta F_k + \Delta RG}$$

The equation then reduces to:

$$\begin{bmatrix} F_k \\ \omega_k \\ \frac{dv}{dt_k} \end{bmatrix} = \begin{bmatrix} \alpha_k & -\alpha_k T_k & 0 \\ 0 & 1 & 0 \\ 0 & 0 & 1 \end{bmatrix} \quad (5)$$

$$\begin{bmatrix} F_{k-1} \\ \omega_{f,k-1} \\ \frac{dv}{dt_{k-1}} \end{bmatrix} + \begin{bmatrix} \alpha_k \\ 0 \\ 0 \end{bmatrix} \Delta F_k + \begin{bmatrix} -\omega_{nf} t_k \alpha_k \\ 0 \\ 0 \end{bmatrix} + \begin{bmatrix} n_{F,k} \\ n_{\omega_f,k} \\ n_{\frac{dv}{dt},k} \end{bmatrix}$$

With the model represented by this state equation, the term "run model" means to calculate a value of $F_k$ for a particular inject k during the initial J injects and thereafter to calculate a value of $\Delta F$ that will result in a desired $F_T$. The term "update model" means to use the collected data to get a better estimate of an actual value of F, to be compared to the value estimated by the model, or of $\omega_f$. One of skill in the art will understand how to use the measurement of V from Equation (3) above to improve the quality of the estimates of fluorine and its consumption rate in the model as represented by Equation (5).

It has been assumed thus far that the value of F is estimated at the very end of each inject, for example at points $F_1$ and $F_2$ on FIG. 3. Similarly, any measurements intended to obtain a more accurate value for F would be taken at these points. However, it will be appreciated that the point at which a desired value of F is to be obtained may be anywhere between injects, where the pressure in the chamber is the target pressure $P_T$, and that it is possible to include this variation in the model with only slight additional calculations needed.

Figure 5:
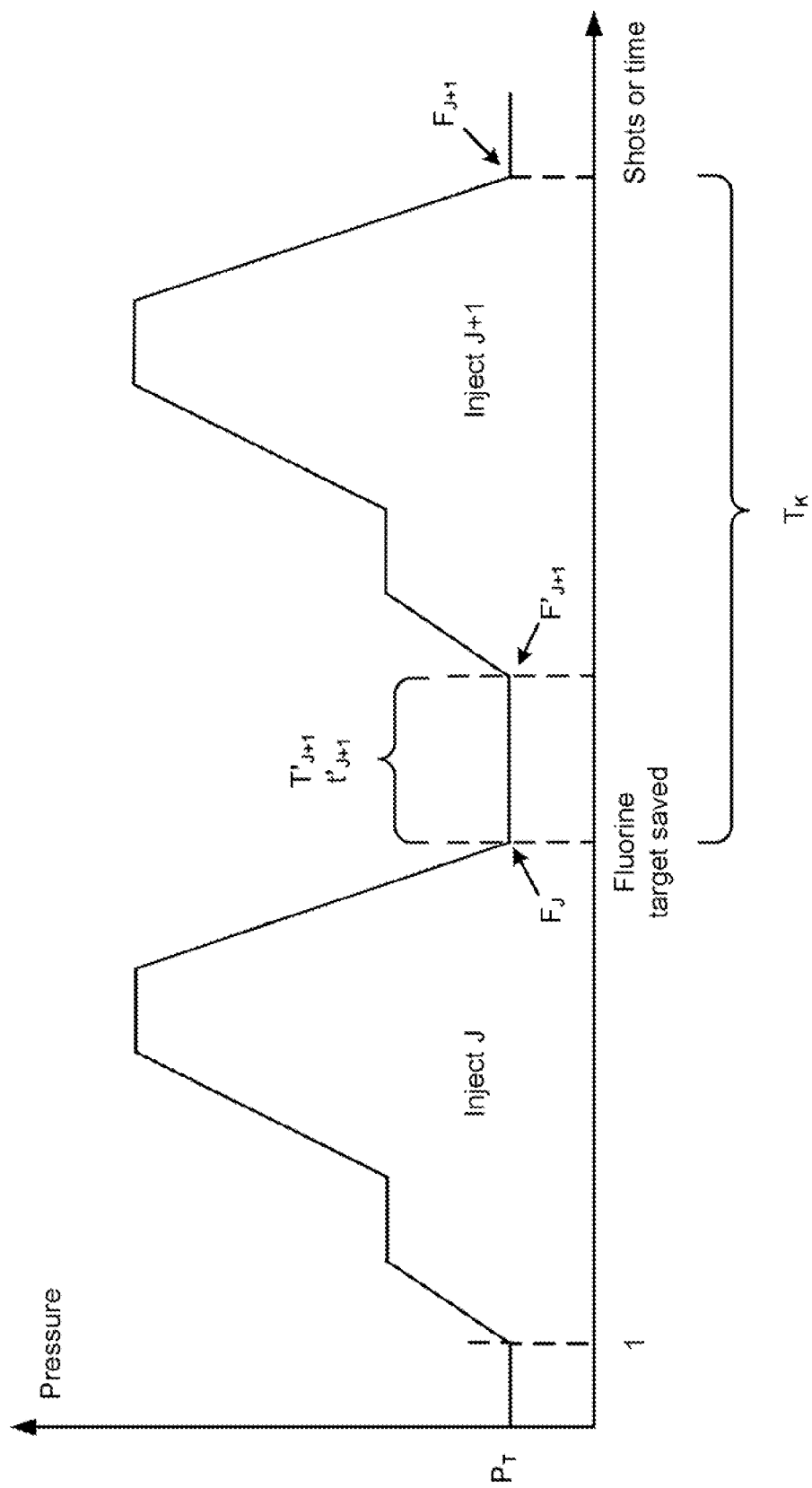
FIG. 5 shows two injects for replenishing the gas in a chamber of a dual chamber gas laser, such as a MOPA excimer laser, for illustrating a model for determining the expected amount of fluorine in the chamber in another embodiment.

It is possible to include the period between injects in the model to refine the calculation of the desired fluorine inject $\Delta F$ if desired. FIG. 5 illustrates two injects J and J+1. As above, all injects before inject J include fixed amounts of fluorine. At the end of inject J, there is an amount of fluorine $F_M$ in the chamber, the value of which becomes the fluorine target $F_T$. Using the model above, it is possible to calculate a value for $\Delta F$ that should result in the value $F_{M+1}$ after the next inject being equal to the target $F_T$.

However, consider the point immediately before the next inject, i.e., inject J+1, begins. The amount of fluorine at this point is designated at $F'_{J+1}$, to distinguish it from the amount of fluorine $F_{J+1}$ after the inject, as seen on FIG. 6. The time from the end of inject J to the start of inject J+1 is designated as $T'_{J+1}$, for the shots fired by the laser during this period, and $t'_{J+1}$, for the elapsed clock time. As above, there is consumption of fluorine due to both of these. However, during this period there is no $\Delta F$ or $\Delta RG$, so the model reduces the change in fluorine during this period to:

$$F'_{J+1} = F_J - \omega_{f,J} T'_{J+1} - \omega_{nf,J} t'_{J+1}$$

where $\omega_{f,M}$ and $\omega_{nf,M}$ are the updated consumption rates after inject J due to firing of the laser and elapsed time respectively, and $F_J$ is the updated fluorine value. Further, both $T'_{J+1}$ and $t'_{J+1}$, i.e., the number of shots and the elapsed time since inject J, are known immediately before inject J+1.

it is thus possible to use the value $F'_{J+1}$ immediately prior to inject J+1 to determine an amount of fluorine $\Delta F_{J+1}$ to be injected during inject J+1 such that the amount of fluorine $F_{J+1}$ in the chamber after inject J+1 is the target amount $F_T$. From the model above, this is given by:

$$\Delta F = \frac{(F_{f+1} - \omega_f T - \omega_{nf} t) P_T - (\Delta RG + P_T) F_T}{F_T - P_T}$$

where $F_T$ is the target fluorine and $P_T$ the pressure target as above, and T and t are the number of shots during, and elapsed time of, the inject respectively. Note that t is a known value, i.e., it is known how long the inject will take. However, T, the number of shots fired, may vary during each inject. Thus, an estimate is made from past inject data for an average value T of shots fired during an inject and used in this equation.

Figure 6:
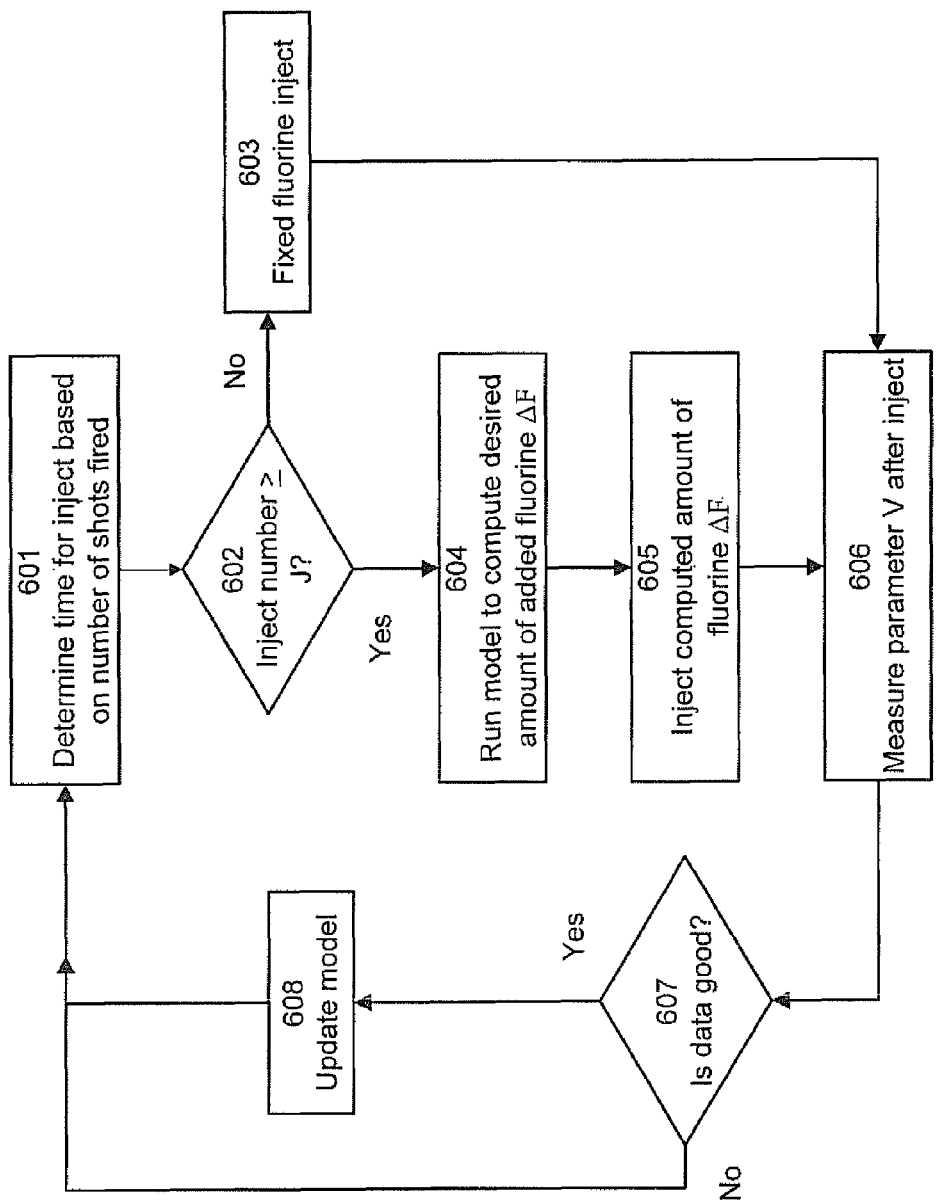
FIG. 6 is a simplified flow chart illustrating steps in a method of determining the amount of fluorine to be added during an inject to a chamber of a dual chamber gas laser, such as a MOPA excimer laser, according to one embodiment.

FIG. 6 is a simplified flow chart illustrating steps in a method 500 of determining the amount of fluorine to be added to a chamber of the laser during an inject as described herein. At step 601, the time to perform an inject as determined. As above, this is known in the prior art, and is typically done after a predetermined number of shots of the laser.

At step 602, it is determined whether J injects have already occurred. If J injects have not already occurred, a fixed amount of fluorine $\Delta F$ is injected at step 603. If J injects have already occurred, then the model described herein is run at step 604 prior to the current inject to determine the amount of fluorine $\Delta F$ that should be injected into the chamber, and the determined amount of fluorine is injected into the chamber at step 605.

Once an inject has occurred, whether fixed or computed, data is obtained by measuring a desired parameter V at step 606 as previously described. At step 607, it is determined whether the obtained data is good and may be used to update the model. If the data is not considered to be good, it is not used. Note that as above, it is presumed that the data is not good, and thus not used, for the first N injects. There may be other reasons that the data is not good, as described below.

If the data is considered to be good, then the model is updated at step 608; as above, in one embodiment this includes running the model after the inject so that the obtained data can be compared to the prediction from the model. Whether the model is updated or not, the process then returns to step 601 to await a determination of the time for the next inject.

One of skill in the art will also appreciate that in some instances, once data is obtained, the actual amount of fluorine in the chamber will vary significantly from the desired amount $F_T$, and that in such a case it may be difficult or undesirable to attempt to correct such a variation in a single inject. Thus, in such cases, a sequence of values for $\Delta F$ may be calculated that results in a decrease in the variation from the desired $F_T$ with each inject, until the desired amount of fluorine is achieved over some number of injects, after which the system and model may function as described herein.

Where the laser has stopped firing for a lengthy period of time for some reason and is then restarted, transients may again occur. In such cases it may be desirable to repeat the sequence of J fixed injects and a smaller N injects before data is collected in order to again let any transients in operation settle and the operating parameters converge on normal operation, just as if the laser were starting up after a refill operation. However, in this situation, it is not necessary to reset the targets determined after a refill, but rather the values determined after the refill may be maintained and used after J injects have occurred after the restart.

As above, it is assumed that any data from the first N injects will not be good enough to use to update the model due to transients. There may be other situations in which the data may also be considered to be unacceptable for this purpose. One way of determining this is as follows.

A shot counter checks at a defined period of elapsed clock time after an inject to see how many shots have been fired since the inject. If the number of shots T is greater than some minimum number $T_{MIN}$, i.e., enough shots have been fired since the end of the inject, then the post-inject collection of data and updating of the model is performed. If T is not greater than $T_{MIN}$, then the number of shots is checked again after the defined period of time; in one embodiment, the shot counter checks every 30 seconds.

If $T_{MIN}$ is reached within some small number of such checks, then data is collected and the model updated. In one embodiment, the value of $T_{MIN}$ is approximately 30 to 50 thousand shots; this is expected to be a sufficiently large number to allow averaging data filters, which receive pulse to pulse data and are typically sampled every 30 seconds, to catch up. However, if it takes too many checks for $T_{MIN}$ to be reached, i.e., the elapsed clock time is too long, the data is considered bad because the laser is not firing at a fast enough rate, and noise is likely to result in any measurements. In one embodiment, if it takes more than a few minutes to reach. $T_{MIN}$ shots, the data is considered bad.

If the system reaches the time for the next inject and no good data has been obtained, then the model is run without updated data to determine the desired amount of fluorine to be added in the next inject. After the next inject, the counter is reset and the process repeats. If good data is obtained, the model is updated.

The method described herein can be used with either chamber, although the values of J and N may be different for each chamber. Alternatively, the injects to the PA chamber may remain fixed as described in co-pending application Ser. No. 13/098,259, owned by the assignee of the current application, and the method described herein used only for the MO chamber.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that while the preferred embodiment is a master oscillator-power amplifier multi-chambered excimer or molecular fluorine gas discharge laser system ("MOPA") the system may also be configured to have other oscillator/amplifier configurations, such as a master oscillator-power oscillator ("MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to cover any such oscillator stage and the term amplifier chamber or stage is broad enough to cover any such amplifier stage. Further, while the above description uses a two stage or chamber laser as an example, the system and method disclosed might also be applied to a single chamber laser or any multi-chamber laser.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
  a master oscillator having a laser chamber containing a lasing medium as comprising a halogen;
  an amplifier having a laser chamber containing a lasing medium gas comprising the halogen;
  a gas replenishment system including a controller configured to perform a replenishment scheme for a selected laser chamber of either the master oscillator or the amplifier at inject opportunities occurring at regular intervals, the replenishment scheme comprising:
    for a first number of inject opportunities, injecting into the selected laser chamber at each inject opportunity a fixed quantity of a non-halogen containing gas and a fixed quantity of a halogen containing gas;
    after the first number of inject opportunities, for each of a second number of inject opportunities:
      running a model of the amount of halogen gas in the selected laser chamber before each inject opportunity and the amount of halogen gas to be injected to the selected laser chamber during the inject opportunity to predict the amount of the halogen as in the selected laser chamber after the inject opportunity;

injecting into the selected laser chamber a fixed quantity of the non-halogen containing gas and a fixed quantity of the halogen containing gas;

measuring a parameter of the laser light source to estimate the amount of halogen gas in the selected laser chamber after the injection of gas;

updating the model based upon the difference between the predicted amount of halogen gas in the selected laser chamber and the estimated amount of halogen gas in the selected laser chamber; and after the second number of inject opportunities, for each of a third number of inject opportunities;

running the model to predict a quantity of halogen containing gas to be injected that will result in a desired amount of halogen as in the selected laser chamber; and injecting into the selected laser chamber at each inject opportunity a fixed quantity of the non-halogen containing gas and the predicted quantity of the halogen containing gas predicted to result in the desired amount of halogen as in the selected laser chamber after the inject opportunity.

2. The dual chamber gas discharge laser light source of claim 1 wherein the halogen comprises fluorine.

3. The dual chamber gas discharge laser light source of claim 1 wherein the regular intervals for inject opportunities are determined by factors comprising one or both of elapsed time and shot count.

4. The dual chamber as discharge laser light source of claim 1 wherein the model includes an estimate of the rate at which halogen gas is consumed in the selected laser chamber.

5. The dual chamber gas discharge laser light source of claim 4 wherein the rate at which halogen gas is consumed in the selected laser chamber is estimated based upon a change in an operating parameter of the laser light source.

6. The dual chamber gas discharge laser light source of claim 5 wherein the selected laser chamber is the amplifier laser chamber and the operating parameter is the discharge voltage in the amplifier laser chamber.

7. The dual chamber gas discharge laser light source of claim 5 wherein the selected laser chamber is the master oscillator laser chamber and the operating parameter is the discharge timing differential between the master oscillator and amplifier.

8. The dual chamber gas discharge laser light source of claim 5 wherein the selected laser chamber is the master oscillator laser chamber and the operating parameter is the bandwidth of the laser light source.

9. The dual chamber gas discharge laser light source of claim 5 wherein the selected laser chamber is the master oscillator laser chamber and the operating parameter is E95.

10. The dual chamber gas discharge laser light source of claim 1 wherein the laser light source is an excimer laser source.

11. The dual chamber gas discharge laser light source of claim 1 wherein running a model of the amount of halogen gas in the selected laser chamber further comprises modeling the amount of halogen gas in the chamber at a selected point after the inject opportunity and before the immediately subsequent inject opportunity.

12. A method of replenishing gas in a dual chamber gas discharge laser light source having a master oscillator and an amplifier, each of the master oscillator and amplifier having a laser chamber containing a lasing medium gas comprising a halogen, the method comprising the steps of:

selecting a plurality of inject opportunities occurring at regular intervals;

for a first number of inject opportunities, injecting into the selected laser chamber at each inject opportunity a fixed quantity of a non-halogen containing as and a fixed quantity of a halogen containing gas;

after the first number of inject opportunities, for each of a second number of inject opportunities:

running a model of the amount as in the selected laser chamber before each inject opportunity and the amount of halogen gas to be injected to the selected laser chamber during the inject opportunity to predict the amount of the halogen gas in the selected laser chamber after the inject opportunity;

injecting into the selected laser chamber a fixed quantity of the non-halogen halogen containing gas and a fixed quantity of the halogen containing gas;

measuring a parameter of the laser light source to estimate the amount of halogen gas in the selected laser chamber after the injection of gas;

updating the model based upon the difference between the predicted amount of halogen gas in the selected laser chamber and the estimated amount of halogen gas in the selected laser chamber; and after the second number of inject opportunities, for each of a third number of inject opportunities;

running the model to predict a quantity of halogen containing gas to be injected that will result in a desired amount of halogen gas in the selected laser chamber; and injecting into the selected laser chamber at each inject opportunity a fixed quantity of the non-halogen containing gas and the predicted quantity of the halogen containing gas to result in the desired amount of halogen gas in the selected laser chamber after the inject opportunity.

13. The method of replenishing gas of claim 12 wherein the halogen comprises fluorine.

14. The method of replenishing gas of claim 12 wherein selecting the plurality of inject opportunities further comprises selecting the regular intervals based upon factors comprising one or both of elapsed time and shot count.

15. The method of replenishing gas of claim 12 wherein the model includes an estimate of the rate at which halogen gas is consumed in the selected laser chamber.

16. The method of replenishing gas of claim 15 wherein the rate at which halogen gas is consumed in the selected laser chamber is estimated based upon a change in an operating parameter of the laser light source.

17. The method of replenishing gas of claim 16 wherein the selected laser chamber is the amplifier laser chamber and the operating parameter is the discharge voltage in the amplifier laser chamber.

18. The method of replenishing gas of claim 16 wherein the selected, laser chamber is the master oscillator laser chamber and the operating parameter is the discharge timing differential between the master oscillator and amplifier.

19. The method of replenishing gas of claim 16 wherein the selected laser chamber is the master oscillator laser chamber and the operating parameter is the bandwidth of the excimer laser light source.

20. The method of replenishing gas of claim 16 wherein the selected laser chamber is the master oscillator laser chamber and the operating parameter is E95.

21. The method of replenishing gas of claim 12 wherein the laser light source is an excimer laser source.

22. The method of replenishing gas of claim 12 wherein running a model of the amount of halogen gas in the selected laser chamber further comprises modeling the amount of halogen as in the chamber at a selected point after the inject opportunity and before the immediately subsequent inject opportunity.

23. A non-transitory computer-readable medium having embodied thereon a program, the program being executable by a processor to perform a method of replenishing gas in a dual chamber gas discharge laser light source having a master oscillator and an amplifier, each of the master oscillator and amplifier having a laser chamber containing a lasing medium gas comprising a halogen, the method comprising the steps of:
- selecting a plurality of inject opportunities occurring at regular intervals;
- for a first number of inject opportunities, injecting into the selected laser chamber at each inject opportunity a fixed quantity of a non-halogen containing gas and a fixed quantity of a halogen containing gas;
- after the first number of inject opportunities, for each of a second number of inject opportunities:
  - running a model of the amount of halogen gas in the selected laser chamber before each inject opportunity and the amount of halogen gas to be injected to the selected laser chamber during the inject opportunity to predict the amount of the halogen gas in the selected laser chamber after the inject opportunity;
  - injecting into the selected laser chamber a fixed quantity of the non-halogen containing gas and a fixed quantity of the halogen containing gas;
  - measuring a parameter of the laser light source to estimate the amount of halogen gas in the selected laser chamber after the injection of gas;
  - updating the model based upon the difference between the predicted amount of halogen gas in the selected laser chamber and the estimated amount of halogen gas in the selected laser chamber; and
- after the second number of inject opportunities, for each of a third number of inject opportunities;
  - running the model to predict a quantity of halogen containing gas to be injected that will result in a desired amount of halogen gas in the selected laser chamber; and
- injecting into the selected laser chamber at each inject opportunity a fixed quantity of the non-halogen containing gas and the predicted quantity of the halogen containing gas to result in the desired amount of halogen gas in the selected laser chamber after the inject opportunity.

* * * * *

UNITED STATES PATENT AND TRADEMARK OFFICE
CERTIFICATE OF CORRECTION

PATENT NO. : 8,681,832 B2
APPLICATION NO. : 13/251181
DATED : March 25, 2014
INVENTOR(S) : Daniel J. Riggs It is certified that error appears in the above-identified patent and that said Letters Patent is hereby corrected as shown below:

In the claims:

Column 14, line 51, replace "lasing medium as" with --lasing medium gas--.
Column 15, line 2, replace "halogen as" with --halogen gas--.
Column 15, line 19, replace "halogen as" with --halogen gas--.
Column 15, line 25, replace "halogen as" with --halogen gas--.
Column 16, line 11, replace "amount as" with --amount of halogen gas--.

Signed and Sealed this
Twenty-first Day of October, 2014

Michelle K. Lee
*Deputy Director of the United States Patent and Trademark Office*